May 13, 1924.

W. M. RANDOLPH 1,494,018

SPREADER FOR BUTTERING CORN ON THE COB

Filed Jan. 10, 1923

INVENTOR
William M. Randolph
BY
Clarke & Doolittle
ATTORNEYS

Patented May 13, 1924.

1,494,018

UNITED STATES PATENT OFFICE.

WILLIAM M. RANDOLPH, OF PITTSBURGH, PENNSYLVANIA.

SPREADER FOR BUTTERING CORN ON THE COB.

Application filed January 10, 1923. Serial No. 611,771.

*To all whom it may concern:*

Be it known that I, WILLIAM M. RANDOLPH, a citizen of the United States, residing at Pittsburgh, in the county of Allegheny and State of Pennsylvania, have invented certain new and useful Improvements in Spreaders for Buttering Corn on the Cob, of which the following is a specification.

This invention is for a butter spreader for buttering corn on the cob, and it has for its object to provide a spreader for this purpose of simple construction, by means of which the butter may be easily spread over an ear of corn.

The invention may be readily understood by reference to the accompanying drawing, in which.

Figure 1:
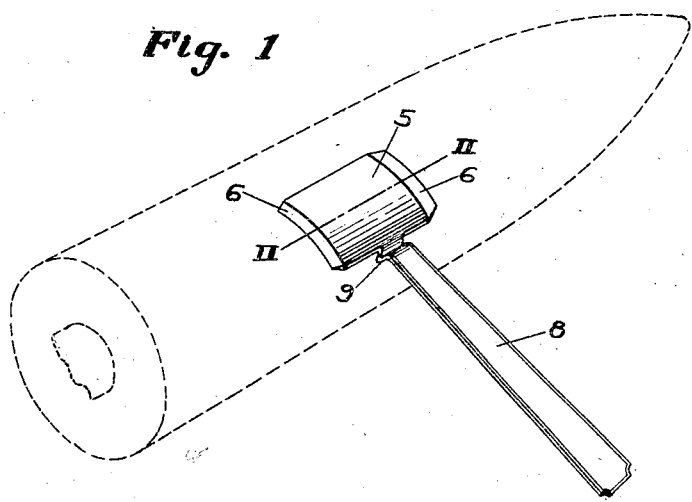
Fig. 1 is a perspective view of the spreader.
Figure 2:
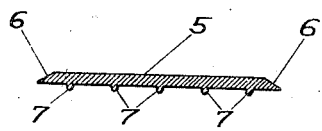
Fig. 2 is a longitudinal section along the blade of the spreader in the plane of line II—II of Fig. 1.

In the drawings, 5 designates the blade of the spreader. This blade is transversely curved to conform somewhat to the surface curvature of the average ear of corn, but is preferably substantially flat in a longitudinal direction. One or both of the end portions of the blade are beveled, as indicated at 6, in order that the blade may be used to cut off a piece of butter of the desired size from a lump. The under concaved surface of the blade is preferably roughened in some manner in order to enable the butter, as it gets soft, to be more readily spread or moved along the cob. I prefer to employ a series of transversely disposed ribs 7, as shown in Fig. 2, for this purpose. These ribs are relatively small and do not interfere in any way with the proper spreading action of the blade.

Figure 3:
Fig. 3 is a side elevation of the spreader.

Joined to the blade about midway between its ends is a laterally extending handle 8 which has a downwardly bent neck portion 9 where it joins the blade. This part of the handle serves to prevent melted butter from running back on the handle, and may also serve as a rest for the spreader when it is laid down, as will be understood by reference to Fig. 3, wherein the dotted line X indicates a surface on which the knife rests.

The entire knife may be made of an integral piece of metal, or the handle and blade may be joined in any suitable way. Its design may be modified to accord with any given pattern of table silver or plated ware. It is neat in appearance, and butter may be more readily spread over the ear than with the usual flat knife. By grasping the handle in the usual manner, the blade may be forced into a lump of butter to detach the desired amount, and this may be retained in the concave face of the blade, and moved over the rows of corn, in a manner which will be readily appreciated.

I claim as my invention:

1. A spreader for buttering corn comprising a blade which is substantially flat in one direction and having a concaved face in the other direction, and a handle secured to said blade.

2. A spreader for buttering corn comprising a blade which is longitudinally flat and transversely curved, and a transversely extending handle secured to the blade.

3. A spreader for buttering corn comprising a longitudinally flat, transversely curved blade having a beveled edge at one end thereof, and a transversely extending handle on the blade.

4. A spreader for buttering corn comprising a longitudinally flat, transversely curved blade portion having means on the under concaved face thereof for engaging a lump of butter to move it over a cob, and a handle connected with said blade.

5. A spreader for buttering corn comprising a longitudinally flat transversely curved blade having a beveled end for cutting into a piece of butter, transversely disposed ribs on the inner curved face of the blade, and a transversely extending handle joined to the blade.

6. A spreader for buttering corn on the cob comprising a longitudinally flat, transversely curved blade, and a transversely extending handle joined with the blade through a downwardly extending neck portion.

In testimony whereof I affix my signature.

WILLIAM M. RANDOLPH.